(12) United States Patent
Chen et al.

(10) Patent No.: US 11,068,431 B1
(45) Date of Patent: Jul. 20, 2021

(54) EDGE COMPONENT REDIRECT FOR IOT ANALYTICS GROUPS

(71) Applicant: VMware, Inc., Palo Alto, CA (US)

(72) Inventors: Tiejun Chen, Beijing (CN); Zhao Gao, Beijing (CN); Elaine Zhao, Beijing (CN); Shreekanta Das, San Jose, CA (US); Niranjan Maka, Union City, CA (US); Kit Colbert, Palo Alto, CA (US)

(73) Assignee: VMWARE INC., Palo Alto, CA (US)

(*) Notice: Subject to any disclaimer, the term of this patent is extended or adjusted under 35 U.S.C. 154(b) by 0 days.

(21) Appl. No.: 16/838,288

(22) Filed: Apr. 2, 2020

(51) Int. Cl.
*G06F 13/40* (2006.01)
*G16Y 40/35* (2020.01)

(52) U.S. Cl.
CPC .......... *G06F 13/4068* (2013.01); *G16Y 40/35* (2020.01)

(58) Field of Classification Search
CPC ............................ G06F 13/4068; G16Y 40/35
See application file for complete search history.

(56) References Cited

U.S. PATENT DOCUMENTS

| | | | | |
|---|---|---|---|---|
| 2014/0324973 A1* | 10/2014 | Goel | ....................... | H04L 47/70 709/204 |
| 2015/0007273 A1* | 1/2015 | Lin | ......................... | H04L 63/08 726/4 |
| 2019/0166125 A1* | 5/2019 | Bender | .................. | H04L 63/065 |
| 2019/0253319 A1* | 8/2019 | Kampanakis | .......... | G06N 5/025 |

\* cited by examiner

*Primary Examiner* — Zachary K Huson
(74) *Attorney, Agent, or Firm* — Thomas Horstemeyer, LLP

(57) ABSTRACT

Disclosed are various examples of providing edge component redirection for IoT analytics groups. In some embodiments, a grouping interface policy is received for an Internet-of-Things (IoT) device that communicates through an interface device of a first edge computing device. The grouping interface policy indicates that the IoT device is assigned to a second edge computing device. A bus redirect of the interface device is enabled. The bus redirect routes traffic between the IoT device and the second edge computing device.

20 Claims, 5 Drawing Sheets

EDGE COMPONENT REDIRECT FOR IOT ANALYTICS GROUPS

BACKGROUND

Appliances, vehicles, sensors, controllers, actuators, and other devices can gather data and interact with the physical world. This traditional network of devices or Internet-of-Things (IoT) can be utilized to improve operations and provide new services. In order to ensure the security and reliability of IoT device connections in an enterprise setting, the enterprise can utilize a management service capable of protecting IoT device data, as well as email, corporate documents, and other enterprise data from theft, data loss, and unauthorized access.

A variety of sensors, actuators, and other IoT devices can be located across an enterprise environment. In order to produce a clear picture of the enterprise environment, the enterprise can desire to combine sets of data. However, the various sensors and actuators can be separated across multiple edge devices. While one solution is to aggregate all of the IoT data in a data lake or other cloud service. However, this solution can require a dedicated data analytics service or another framework to send IoT data to a remote location, access and analyze it using a separate service, and then pull down the result. This can be costly in time, network usage, and processing power. As a result, there is a need for more efficient and effective IoT device aggregation at the edge.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing edge component redirect for IoT analytics groups. An enterprise environment can include a variety of sensors, actuators, and other IoT devices located across an enterprise environment. Certain enterprise computations and decisions like edge computing can utilize sensor data or states for multiple IoT devices as such, that are connected to an enterprise network through multiple different edge devices. Edge devices such as gateways, routers, and edge servers are increasing in computational power, allowing decisions and computations for alerts and other actions to be made at the edge device. However, an edge device may not have access to IoT data from IoT devices that are connected to other edge devices. As a result, traditional solutions can include transmitting the data to a cloud service or data lake, making the decision or computation, and pulling down the result. This approach can be costly in time and network usage. This approach can also be inflexible, requiring specific data management rules for aggregation and filtration. The present disclosure describes a mechanism that can solve this issue of using edge component redirect for IoT analytics groups.

Figure 1:
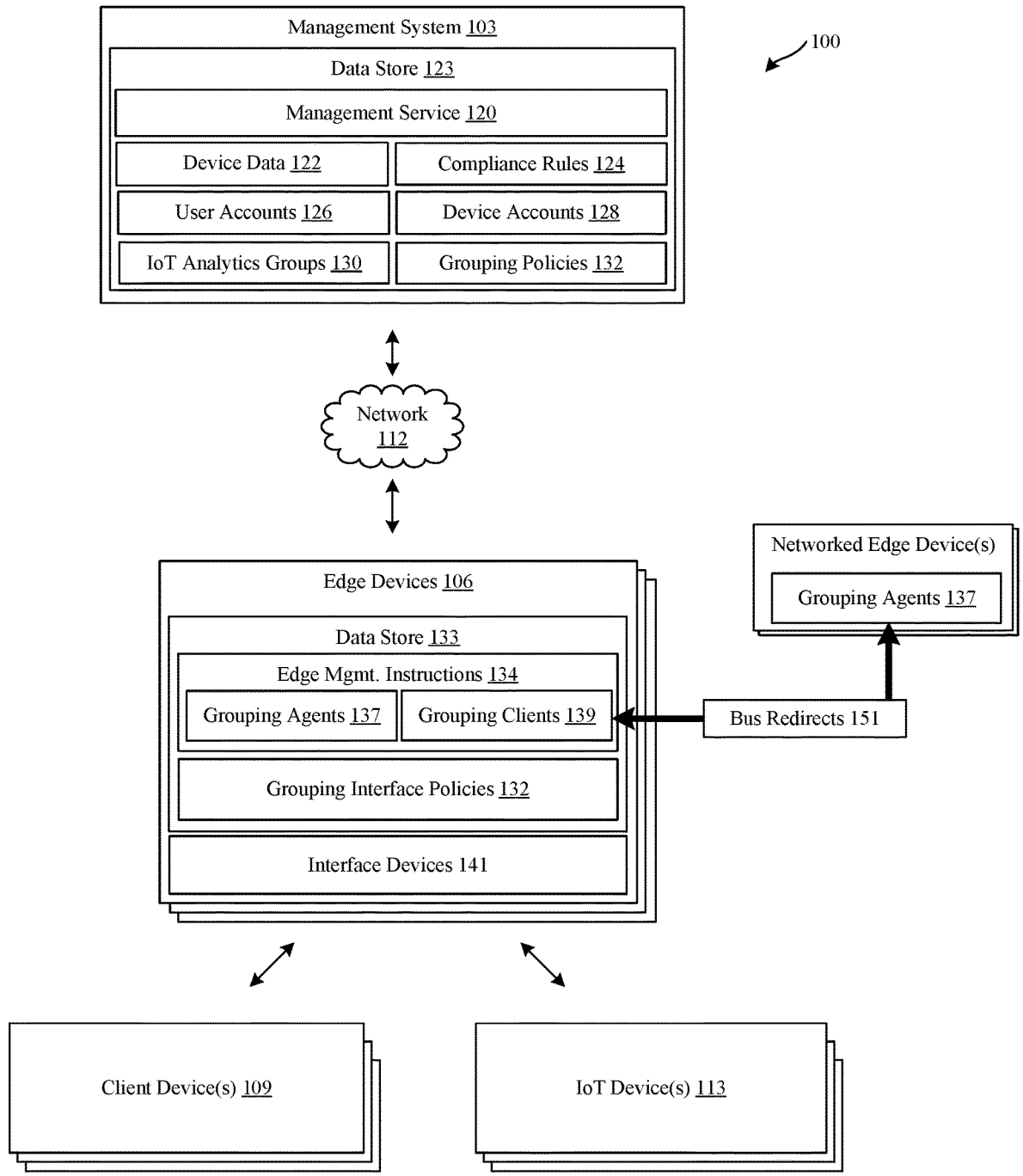
FIG. 1 is a drawing of an example of a networked environment that includes components that provide a framework for edge component redirect for IoT analytics groups.

With reference to FIG. 1, shown is an example of a networked environment 100. The networked environment 100 can include a management system 103, edge devices 106, client devices 109, Internet-of-Things (IoT) devices 113, and other components in communication with one another over a network 112. In some cases, IoT devices 113 and other devices can connect to the network 112 through the edge device 106. The components of the networked environment 100 can be utilized to provide edge component redirect for IoT analytics groups 130.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. The computing devices of the management system 103 can be located in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above.

The components executed on the management system 103 can include a management service 120, as well as other applications, services, processes, systems, engines, or functionality not discussed in detail herein. The management service 120 can be stored in the data store 123 of the management system 103. While referred to generally as the management service 120 herein, the various functionalities and operations discussed can be provided by the management service 120 or any of its components. The management service 120 can communicate with associated management instructions of the edge devices 106, client devices 109, and IoT devices 113 to ensure that these devices comply with their respective compliance rules 124. If the devices fail to comply with the compliance rules 124, the respective management instructions installed on the edge devices 106, client devices 109, and IoT devices 113 can disable communications with a local intranet provided by one or more of the edge devices 106 and can disable communications with the management services 120.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory. The data store 123 can include memory of the management system 103, mass storage resources of the management system 103, or any other storage resources on which data can be stored by the management system 103.

The data stored in the data store 123 can include management data including device data 122, enterprise data, compliance rules 124, user accounts 126, device accounts 128, IoT analytics groups 130, interface policies 132, as well as other data. Device data 122 can identify client devices 109, edge devices 106, and IoT devices 113 by one or more of a device identifier, a unique device identifier (UDID), a media access control (MAC) address, an internet protocol (IP) address, or another identifier that uniquely identifies a device with respect to other devices. The device identifiers can include a edge device identifier of an edge device 106 and an IoT device identifier of an IoT device 113. The device data 122 can include an enrollment status indicating whether each client device 109, edge device 106, or IoT device 113 is enrolled with or managed by the management service 120. A client device 109, edge device 106, or IoT device 113 designated as "enrolled" can be permitted to access the enterprise data, while a client device 109, edge device 106, or IoT device 113 designated as "not enrolled," or having no designation, can be denied access to the enterprise data. In some cases, the enrollment of an IoT device 113 can include registering the IoT device 113 with the management service 120. Enrollment can indicate that an administrative user has authorized the IoT device 113 to communicate with the management service 120. Enrollment can also indicate that the edge device 106 has been provided with instructions to permit the IoT device 113 to access the network 112 and the management service 120 through the edge device 106. In some cases, enrollment of the IoT device 113 can include installation of a profile that enforces compliance rules 124 on the IoT device 113. A client device 109, an edge device 106, and an IoT device 113 can be enrolled and registered in association with a respective device account 128 that indicates device type, device identifier, location, role, capabilities, and assigned IoT analytics group 130 that can be performed by each device.

The device data 122 can further include indications of the state of devices including the client devices 109, edge devices 106, and IoT devices 113. For instance, these indications can specify applications that are installed on the client devices 109, edge devices 106, and IoT devices 113, configurations or settings that are applied to each of the devices, user accounts 126, device accounts 128, or service accounts associated with each of the devices, the physical locations of each of the devices, the network to which each of the devices is connected, and other information describing the current state of each of the devices. While a user account 126 can be associated with a particular person, a device account 128 can be unassociated with any particular person, and can nevertheless be utilized for client devices 109, edge devices 106, or IoT devices 113 that provide certain functionalities, such as automatic functionalities. The IoT device 113 can be associated with a service account or a device account 128 that is user unassociated, or not associated with any person. Each of the edge devices 106 can be enrolled with the management service 120 and can be associated with a respective device account 128. A device account 128 for an edge device 106 can be referred to as an edge account. Likewise, each of the IoT devices 113 can be enrolled with the management service 120 and can be associated with a respective device account 128. A device account 128 for an IoT device 113 can be referred to as an IoT device account.

Compliance rules 124 can include, for example, configurable criteria that must be satisfied for an enrolled one of the client devices 109, edge devices 106, and IoT devices 113 to be in compliance with the management service 120. The compliance rules 124 can be based on a number of factors, including geographical location, activation status, enrollment status, and authentication data, including authentication data obtained by a device registration system, time, and date, and network properties, among other factors associated with each device. The compliance rules can also be determined based on a user account 126 associated with a user. In some cases, an edge device 106 can be unassociated with a user, but can nevertheless be associated with a service account, a device account 128, or another user account 126 that is unassociated with a user.

Compliance rules 124 can include predefined constraints that must be met in order for the management service 120, or other applications, to permit edge devices 106, client devices 109, and IoT devices 113 with access to enterprise data and other functions of the management service 120, as well as connectivity through the edge device 106. The management service 120 can communicate with edge management instructions 134 to determine whether states exist on the edge device 106 that do not satisfy one or more compliance rules 124. States can include, for example, a virus or malware being detected on the device; installation or execution of a blacklisted application; and/or a device being "rooted" or "jailbroken," where root access is provided to a user of the device. Additional states can include the presence of particular files, questionable device configurations, vulnerable versions of applications, vulnerable states of IoT devices 113 or other vulnerability, as can be appreciated.

Device data 122 can also include data pertaining to user groups. An administrator can specify one or more of the user accounts 126 and device accounts 128 to a user group. User groups can be created by an administrator of the management service 120 such that a batch of client devices 109, edge devices 106, and/or IoT devices 113 can be configured according to common settings. For instance, an enterprise can create a user group for the marketing department and the sales department, where the client devices 109, edge devices 106, and/or IoT devices 113 in the marketing department are configured differently from the client devices 109, edge devices 106, and/or IoT devices 113 in the sales department.

Device data 122 can also include data pertaining to IoT analytics groups 130. An administrator can specify a number of client devices 109 and IoT devices 113 as belonging to an IoT analytics group 130 for a particular IoT computation. Each IoT analytics group 130 can refer to a group of client devices 109 and IoT devices 113 that are assigned to a single edge device 106 to perform the IoT computation. In some cases, the edge device 106 can be specified in the IoT analytics group 130. However, the actual connections of client devices 109 and IoT devices 113 in an IoT analytics group 130 can be through respective interface devices 141 on multiple different edge devices 106. In order to connect the entire IoT analytics group 130 to a single edge device 106, the disparate interface devices 141 can be redirected from their respective edge devices 106 to a selected edge device 106.

The management service 120 can communicate with the edge device 106 to determine whether states exist that do not satisfy one or more compliance rules 124 regarding the edge device 106 and IoT devices 113. The IoT device 113 can transmit IoT data, such as sensor data or status data to an upstream target, such as an endpoint of the management service 120, edge device 106, or a datacenter. The endpoint can be an IP address, a URL, or other network address identifier. In some cases, the edge device 106 can receive IoT device 113 communications. The edge device 106 can pass or otherwise transmit the IoT data to the management service 120. The IoT device 113 can also transmit status data to the management service 120 for evaluation of compliance rules. In some cases, the management service 120 can transmit all or a portion of the compliance rules 124 to the edge device 106. The edge device 106 can determine or evaluate whether states exist on the IoT devices 113, that do not satisfy one or more compliance rules 124. The edge device 106 can perform this in some cases without passing or transmitting the status data to the management service 120. In any case, determining that states exist in the IoT device 113 that do not satisfy one or more compliance rules 124 can trigger transmission of an action or command that causes the IoT device 113 to be in compliance with the compliance rules 124.

The management service 120 can oversee the management of devices including the client devices 109, edge devices 106, and IoT devices 113. The management service 120 can oversee the operation of the devices enrolled with the management service 120 as well as enrollment and un-enrollment operations for the devices using the management service 120. The management service 120 can provide functionality using application program interfaces (APIs). To this end, an API of the management service 120 can provide enrollment information regarding a device, such as whether the device is enrolled with the management service 120. APIs or API calls can be provided for other functionalities of the management service 120 as discussed herein.

The management service 120 can generate interface policies 132 using the IoT analytics groups 130, as well as the devices data 122, compliance rules 124, user accounts 126, and device accounts 128. A grouping interface policy 132 can specify bus redirection rules for a particular interface device 141. For example, an IoT analytics group 130 can indicate that IoT data from a set of the IoT devices 113 and client devices 109 is utilized for a particular computation or decision. The grouping interface policy 132 can indicate that the interface device 141 is to be redirected from the edge device 106 to which it is connected, to another edge device 106 using a bus redirect 151. While multiple IoT devices 113 can communicate through an interface device 141, the grouping interface policy 132 specify that IoT data from only a subset of those IoT devices 113 should be forwarded through a particular bus redirect 151. In this way, the interface policies 132 can allow a grouping client 139 to mirror a single physical interface device 141 of the edge device 106 to multiple networked edge devices. In some cases, the management service 120 can also cause edge management instructions 134 to install respective grouping agents 137 and grouping clients 139 on the appropriate edge devices 106. The bus redirect 151 can route network traffic from the IoT device to the second edge computing device over a local area network (LAN). The bus redirect 151 can route network traffic from the IoT device 113 to the second edge computing device without transmitting the traffic over a wide area network (WAN) or the Internet. The bus redirect 151 can reduce time between IoT data transmission and the computation and decision making process.

Edge devices 106 can include gateways, routers, routing switches, integrated access devices (IADs), multiplexers, and local intranet server devices. The edge devices 106 can include edge management instructions 134. Edge management instructions 134 can include instructions that communicate with the management service 120 of the management system 103 through direct communication transmissions as well as command queues for the edge devices 106. In order to communicate with IoT devices 113 that utilize a particular IoT protocol, the edge devices 106 can be configured to include IoT protocol communication instructions, which can enable communications using IoT protocols. IoT protocols can include BacNet, Profinet, Profibus, LoraWAN, ZigBee, Z Wave, MQTT, CoAP, and others. The interface devices 141 can include separate interface devices 141 for each communication protocol. In other examples, an interface device 141 can utilize more than one communication protocol. Edge management instructions 134 can also include a grouping agent 137 and a grouping client 139, among other instructions for management of the edge device 106 and its connected devices.

The grouping agents 137 can be used to access interface devices 141 remotely or over a network connection using bus redirects 151. The grouping clients 139 can be used to provide networked access to interface devices 141 using the bus redirects 151. The grouping clients 139 can also report or register the locally connected interface devices 141, and the devices connected through each locally connected interface device 141, with the management service 120. The management service 120 can maintain a list of connected interface devices 141 for each respective edge device 106, for example, in the device account 128 for the edge device 106. The management service 120 can also maintain a list of the IoT devices 113 and client devices 109 connected through each interface device 141. The grouping agent 137 and the grouping client 139 can be considered a distributed application or framework that provides bus redirects 151 of interface devices 141 for IoT analytics groups. The grouping agent 137 and the grouping client 139 can be executed on a respective one of the edge devices 106. The grouping agent 137 can include a subproxy or another network address or endpoint corresponding to each bus redirect 151 to the edge device 106.

The interface devices 141 can include communications and other interfacing devices. Interface devices 141 can include wired and wireless interface devices connected to one or more local bus of the edge device 106. For example, the interface devices 141 can include RS485 controllers, CAN controllers, Bluetooth adapters, and WiFi adapters. An IoT device 113 can connect through an appropriate interface device 141.

The bus redirect 151 is shown from the grouping client 139 of an edge device 106 to a grouping agent 137 on a networked edge device. The bus redirect 151 can intercept bus traffic intended for an interface device 141 connected to a bus of the edge device 106 and redirect this traffic across a network to the networked edge device. The local device bus can include a USB, PCI-e bus, or another bus. The networked edge device can be "networked" with respect to an interface device 141 that is being redirected using the bus redirect 151 from the grouping client 139 to the grouping agent 137 of the networked edge device. Bus redirects 151 are discussed in further detail in FIGS. 2A and 2B.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute various client applications. The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The IoT device 113 can include appliances, vehicles, sensors, controllers, actuators, monitors, phones, tablets, thermostats, speakers, screen boards, kiosks, and other devices and can incorporate processor-based systems, such as a computer system or any other device with like capability. The IoT device 113 can, in some examples, include a headless device without a graphical user interface. Such a headless device can have inputs and outputs through other interfaces like network or serial ports. An IoT device 113 can include an ad board, information board, or other screen board that provides a graphical display but generally does not provide for user interaction with the graphical display and rejects access to system functions. In further cases, an IoT device 113 can include a kiosk or interactive graphical user interface that is locked into a defined functionality and rejects access to system functions. The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable.

Figure 2A:
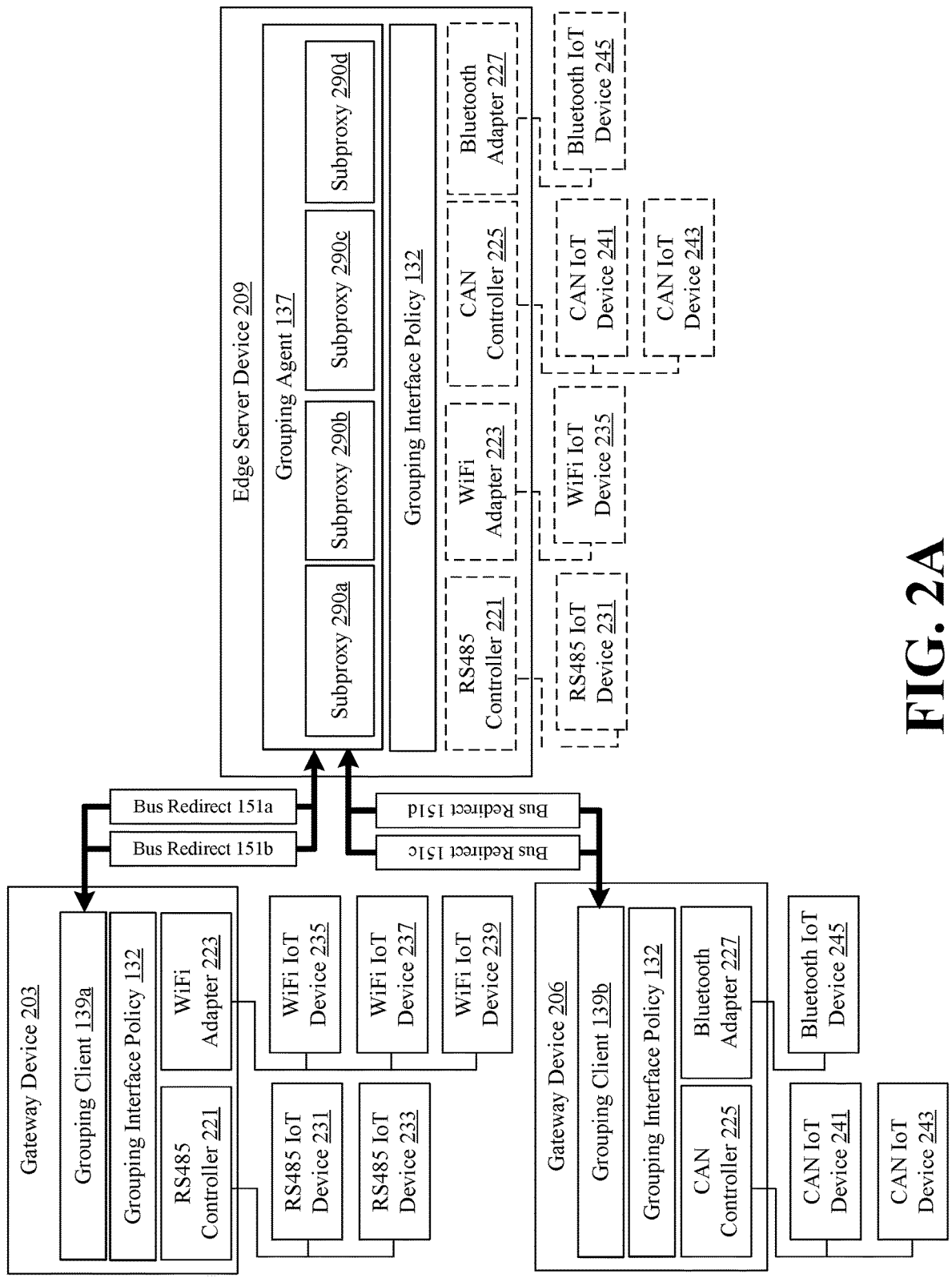
FIG. 2A is a drawing illustrating an example of functionality implemented by components of the networked environment.

FIG. 2A shows an example of edge component redirection for IoT analytics groups 130, performed by components of the networked environment 100. In this example, the edge devices 106 of the networked environment 100 can include a gateway device 203, another gateway device 206, and an edge server device 209. The interface devices 141 physically connected to the gateway device 203 can include an RS485 controller 221 and a WiFi adapter 223. The gateway device 203 can execute a grouping client 139a. The interface devices 141 physically connected to the gateway device 206 can include a controller area network (CAN) controller 225 and a Bluetooth adapter 227. The gateway device 206 can execute a grouping client 139b. The edge server device 209 can execute a grouping agent 137 that includes subproxies 290a, 290b, 290c, and 290d, corresponding to endpoints for the bus redirects 151a, 151b, 151c, and 151d.

RS485 IoT devices 231 and 233 can communicate through the RS485 controller 221 of the gateway device 203. WiFi IoT devices 235, 237, and 239 can communicate through the WiFi adapter 223 of the gateway device 203. CAN IoT devices 241 and 243 communicate through the CAN controller 225 of the gateway device 206. A Bluetooth IoT device 245 communicates through the Bluetooth adapter 227 of the gateway device 206.

The edge server device 209 can execute a grouping agent 137 that includes subproxies 290a, 290b, 290c, and 290d, according to the grouping interface policy 132. The grouping interface policy 132 can indicate that the RS485 IoT device 231, WiFi IoT device 235, CAN IoT devices 241 and 243, and the Bluetooth IoT device 245 are assigned to the edge server device 209 for an edge computation performed by the edge server device 209. In other words, the RS485 IoT device 231, WiFi IoT device 235, CAN IoT devices 241 and 243, and the Bluetooth IoT device 245 are grouped into an IoT analytics group 130 that is assigned to the edge server device 209. The management service 120 can generate the grouping interface policy 132 and transmit it for implementation by the relevant grouping agents 137 and grouping clients 139.

However, these IoT devices 113 do not directly communicate through interface devices 141 on the edge server device 209, but rather they directly communicate through interface devices 141 of the gateway devices 203 and 206. The grouping agents 137 and grouping clients 139 on the edge server device 209 and the gateway devices 203 and 206 can work in concert to implement the grouping interface policy 132. The management service 120 can cause the edge management instructions 134 to install the respective grouping agents 137 and grouping clients 139 on the appropriate edge devices 106. In some examples, the grouping interface policy 132 can include subpolicies or individual grouping interface policies that correspond to individual ones of the interface devices 141.

The gateway device 203 can execute the grouping client 139a. The grouping client 139a can create a bus redirect 151a from the gateway device 203 to the edge server device 209 in order to implement the grouping interface policy 132. The bus redirect 151a can correspond to a subproxy 290a. The grouping interface policy 132 can indicate that the RS485 IoT device 231 communicating through the RS485 controller 221 is to be virtually connected to the edge server device 209 using the bus redirect 151a, while the RS485 IoT device 233 and 237 should not be virtually connected to the edge server device 209. The grouping client 139a can detect traffic from the RS485 IoT device 231, and route that traffic through the bus redirect 151a. The grouping client 139a can decline to route traffic from the RS485 IoT device 233 through the bus redirect 151a. In some cases, traffic from the RS485 IoT device 233 can be routed to another edge device 106 to implement another grouping interface policy 132. The grouping client 139a can also receive traffic through the bus redirect 151a for the IoT device 231 and deliver this traffic to the RS485 IoT device 231.

The grouping client 139a can also create a bus redirect 151b from the gateway device 203 to the edge server device 209 in order to implement a grouping interface policy 132 for an IoT analytics group 130. The bus redirect 151b can correspond to a subproxy 290b. The grouping interface policy 132 can indicate that the WiFi IoT device 235 communicating through the WiFi adapter 223 is to be virtually connected to the edge server device 209 using the bus redirect 151b, while the WiFi IoT devices 237 and 239 should not be virtually connected to the edge server device 209. The grouping client 139a can detect traffic from the WiFi IoT device 235, and route that traffic through the bus redirect 151b. The grouping client 139a can decline to route traffic from the WiFi IoT device 233 through the bus redirect 151b. The grouping client 139a can also receive traffic through the bus redirect 151b for the WiFi IoT device 235 and deliver this traffic to the WiFi IoT device 235.

The gateway device 206 can execute the grouping client 139b. The grouping client 139b can create a bus redirect 151c from the gateway device 206 to the edge server device 209 in order to implement the grouping interface policy 132. The bus redirect 151c can correspond to a subproxy 290c. The grouping interface policy 132 can indicate that the CAN IoT devices 241 and 243 communicating through the CAN controller 225 are to be virtually connected to the edge server device 209 using the bus redirect 151c. The grouping client 139b can detect traffic from the CAN IoT devices 241 and 243, and route that traffic through the bus redirect 151c. In other words, in this case the grouping client 139b can redirect all traffic of CAN controller 225 to the grouping agent 137 subproxy 290c on the edge server device 209. The grouping client 139b can also receive traffic through the bus redirect 151c for the CAN IoT devices 241 and 243 and deliver this traffic to the CAN IoT devices 241 and 243.

The grouping client 139b can also create a bus redirect 151d from the gateway device 206 to the edge server device 209 in order to implement the grouping interface policy 132. The bus redirect 151d can correspond to a subproxy 290d. The grouping interface policy 132 can indicate that the Bluetooth IoT device 245 communicating through the Bluetooth adapter 227 is to be virtually connected to the edge server device 209 using the bus redirect 151d. The grouping client 139b can detect traffic from the Bluetooth IoT device 245 and route that traffic through the bus redirect 151d. In other words, in this case the grouping client 139b can redirect all traffic of Bluetooth adapter 227 to the grouping agent 137 subproxy 290d on the edge server device 209. The grouping client 139b can also receive traffic through the bus redirect 151d for the Bluetooth IoT device 245 and deliver this traffic to Bluetooth IoT device 245.

Figure 2B:
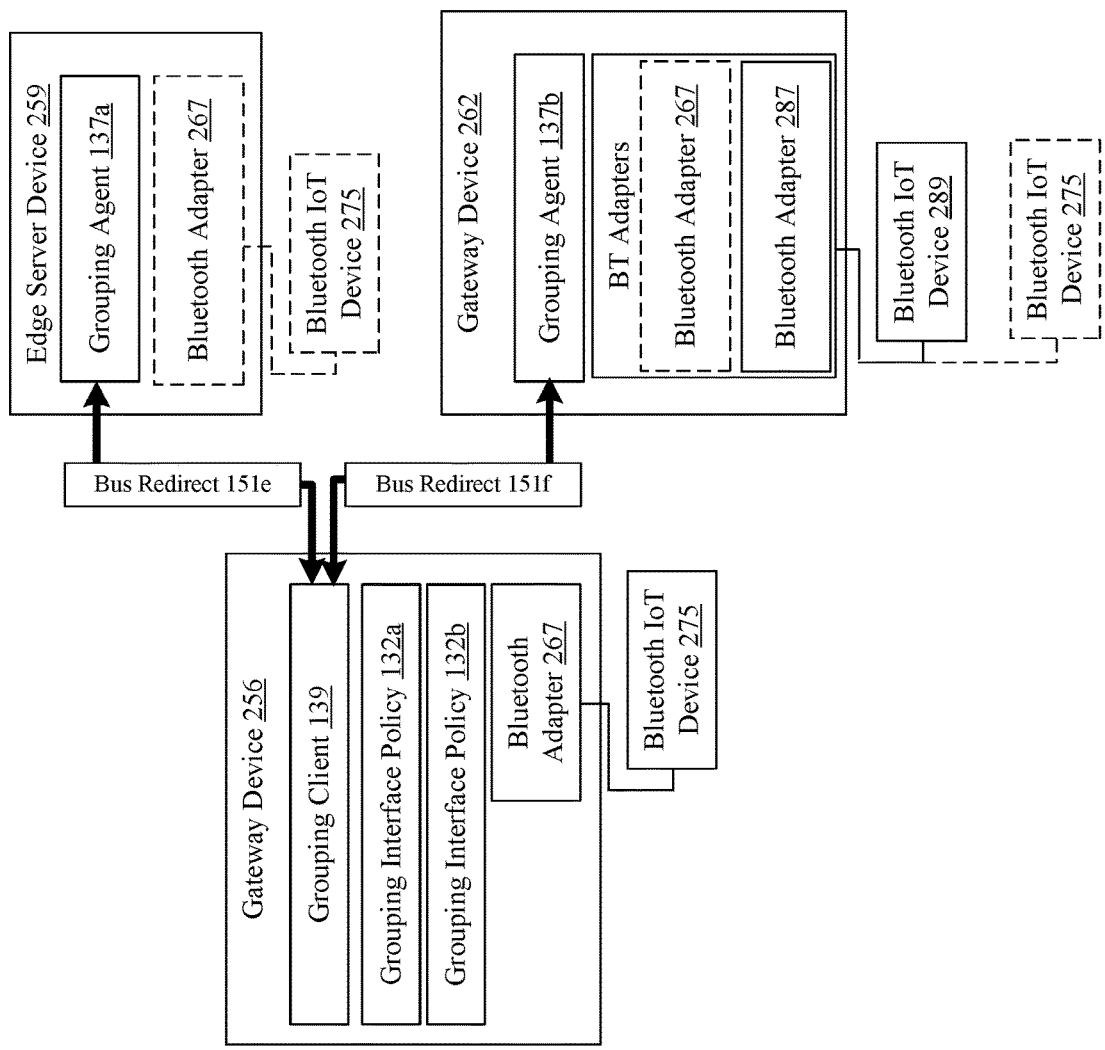
FIG. 2B is a drawing illustrating another example of functionality implemented by components of the networked environment.

FIG. 2B shows an example of edge component redirection for IoT analytics groups 130, performed by components of the networked environment 100. In this example, the edge devices 106 of the networked environment 100 can include a gateway device 256, an edge server device 259, and a gateway device 262. The interface devices 141 physically connected to the gateway device 256 can include a Bluetooth adapter 267. The gateway device 256 can execute a grouping client 139. The edge server device 259 can execute the grouping agent 137a. The gateway device 262 can execute a grouping agent 137b.

The grouping client 139 can create a bus redirect 151e from the gateway device 256 to the edge server device 259 in order to implement a grouping interface policy 132a. The bus redirect 151e can correspond to a grouping agent 137a on the edge server device 259. The grouping interface policy 132a can indicate that the Bluetooth IoT device 275 communicating through the Bluetooth adapter 267 is to be virtually connected to the edge server device 259 using the bus redirect 151e. The grouping client 139 can detect traffic from the Bluetooth IoT device 275 and route that traffic through the bus redirect 151e. The grouping client 139 can also receive traffic for the Bluetooth IoT device 275 through the bus redirect 151e and deliver this traffic to Bluetooth IoT device 275.

The grouping client 139 can redirect or mirror a single physical interface device 141 to multiple different edge devices 106, and according to multiple grouping interface policies 132. In other words, the grouping client 139 can mirror the Bluetooth adapter 267 to both the edge server device 259 and the gateway device 262. To this end, the grouping client 139 can also create a bus redirect 151f from the gateway device 256 to the gateway device 262 in order to implement a grouping interface policy 132b. The bus redirect 151f can correspond to a grouping agent 137b on the gateway device 262. The grouping interface policy 132b can indicate that the Bluetooth IoT device 275 communicating through the Bluetooth adapter 267 is to be virtually connected to the edge server device 259 using the bus redirect 151f. The grouping client 139 can detect traffic from the Bluetooth IoT device 275 and route that traffic through the bus redirect 151f, while also redirecting this traffic through the bus redirect 151e as indicated above. The grouping client 139 can also receive traffic for the Bluetooth IoT device 275 through the bus redirect 151f and deliver this traffic to Bluetooth IoT device 275.

The gateway device 262 can include a Bluetooth adapter 287 physically connected to a local bus, while also being virtually connected to the Bluetooth adapter 267 though the bus redirect 151f. As a result, the gateway device 262 can perform an edge device computation that utilizes sensor readings or other IoT data from the Bluetooth IoT device 275 communicating through the virtually-connected Bluetooth adapter 267 and the Bluetooth device 289 communicating through the physically-connected Bluetooth adapter 287.

Figure 3:
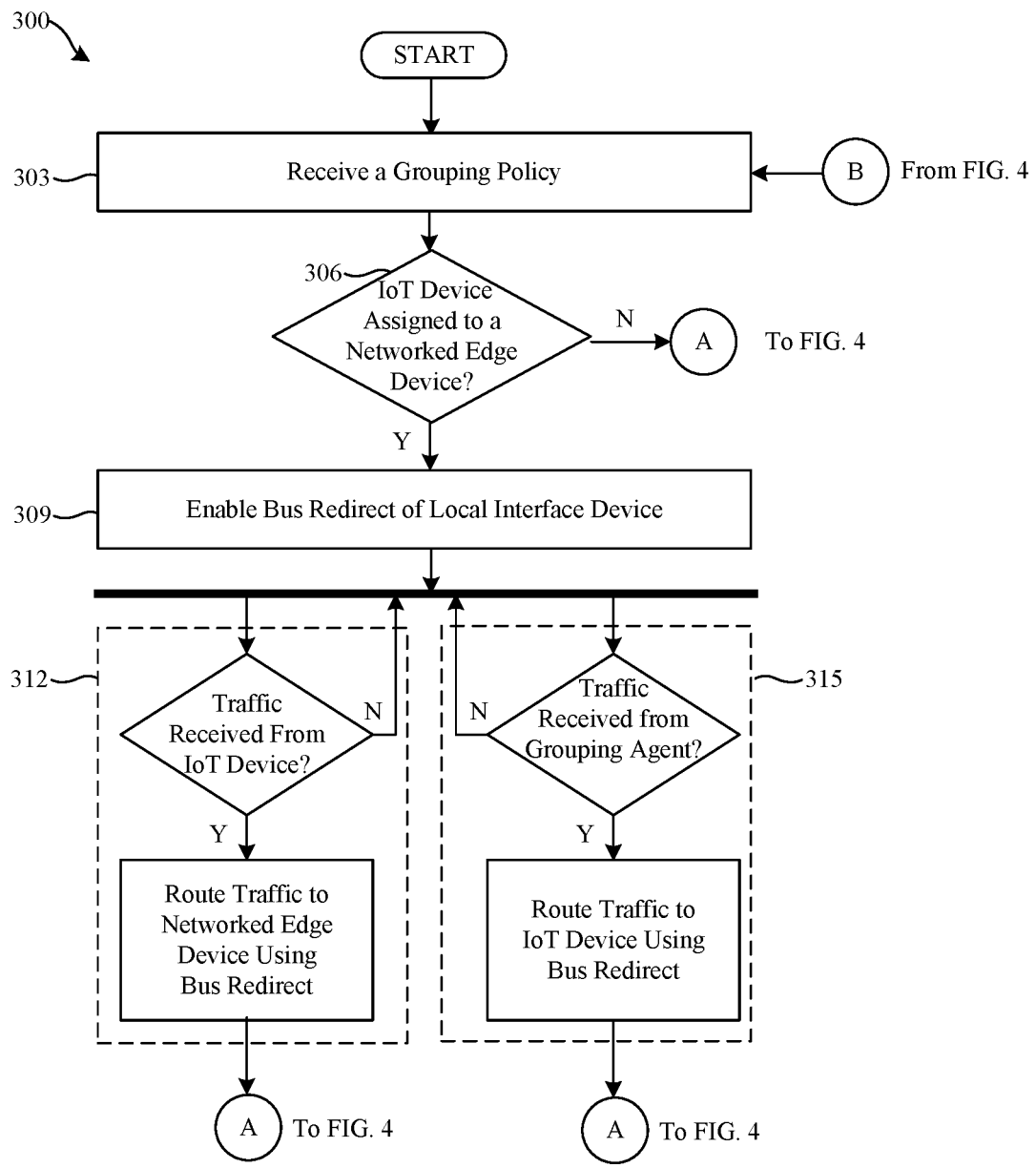
FIG. 3 is a flowchart illustrating functionality implemented by components of the networked environment.

FIG. 3 shows a flowchart 300 that illustrates an example of the operation of the components of the networked environment 100. While aspects of each of the components are included, the flowchart 300 generally describes how the grouping client 139 coordinates with other components of the networked environment 100 to provide edge component redirection for IoT analytics groups 130. As a result, IoT data from disparately located IoT devices 113 can be routed to a single edge device 106 to perform edge computations, decision-making, and other analytics for the IoT analytics group 130.

In step 303, the grouping client 139, grouping agent 137, or other edge management instructions 134 can receive a grouping interface policy 132. For example, the management service 120 can generate a grouping interface policy 132 based on an IoT analytics group 130. The grouping interface policy 132 can be generated for a particular edge device 106, for a group of edge devices 106, or for specific interface devices 141 of an edge device 106. The IoT analytics group 130 can specify a set of IoT devices 113 and client devices 109 that are utilized for IoT computations, decision-making, or other analytics. The grouping interface policy 132 can indicate that a local IoT device 113 is assigned to a networked edge device 106 based on its IoT analytics group 130. The local IoT device 113 can refer to an IoT device 113 that is connected to a local interface device 141 of the local edge device 106. The edge management instructions 134 can check in with a command queue and retrieve the grouping interface policy 132.

In step 306, the grouping client 139 can determine whether an IoT device is assigned to a networked edge device 106. While the local IoT device 113 can communicate through a local interface device 141 of a local edge device 106, the grouping interface policy 132 can indicate that the local IoT device 113 is assigned to a networked edge device 106 based on its IoT analytics group 130. The networked edge device 106 can be considered networked with respect to the local edge device 106 and a local interface device 141 that is connected to the local edge device 106. If the grouping interface policy 132 indicates that the local IoT device 113 is assigned to a networked edge computing device 106, the process can move to step 309. Otherwise, the process can move to connector A, which connects to FIG. 4.

In step 309, the grouping client 139 can enable a bus redirect 151 of the local interface device 141. The bus redirect 151 can redirect the local interface device 141 from the local interface device 141 to the networked edge device 106. The local IoT device 113 can communicate through the local interface device 141, so the bus redirect 151 can route traffic from the local IoT device 113 to the networked edge device 106. In addition, the bus redirect 151 can route traffic from the networked edge device 106 to the local IoT device 113. The bus redirect 151 can be enabled using the grouping client 139 on the local edge device 106 and a networked grouping agent 137 on the networked edge device 106. The grouping client 139 can be considered a local grouping client 139. The networked grouping agent 137 can be networked with respect to the local edge device 106 on which the grouping client 139 is executed.

In step 312, the grouping client 139 can determine whether traffic is received from the local IoT device 113. The traffic can include sensor data, device states, and other IoT data generated by the local IoT device 113. If traffic is received from the local IoT device 113, the grouping client 139 can route that traffic through the bus redirect 151 to the networked edge device 106.

In step 315, the grouping client 139 can determine whether traffic is received from the grouping agent 137. The traffic can include commands to perform actions, collect metrics, and other instructions for the local IoT device 113 to perform. If traffic is received from the grouping agent 137, the grouping client 139 can route the traffic to the IoT device using the bus redirect 151.

Figure 4:
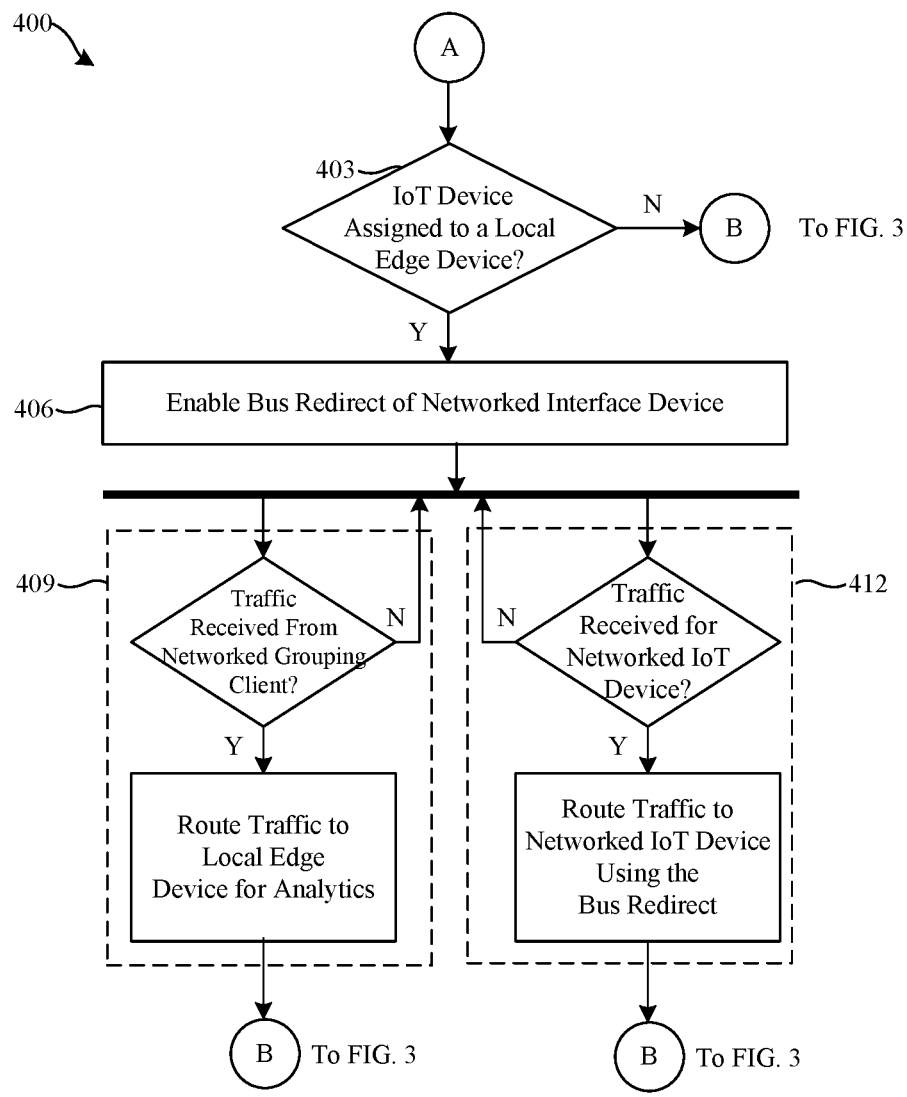
FIG. 4 is a flowchart illustrating functionality implemented by components of the networked environment.

FIG. 4 shows a flowchart 400 that illustrates an example of the operation of the components of the networked environment 100. While aspects of each of the components are included, the flowchart 400 generally describes how the grouping agent 137 coordinates with other components of the networked environment 100 to provide edge component redirection for IoT analytics groups 130. As a result, IoT data from disparately located IoT devices 113 can be routed to a single edge device 106 to perform edge computations, decision-making, and other analytics for the IoT analytics group 130. The flowchart 400 follows the example of FIG. 3, where the grouping client 139 and grouping agent 137 are executed on a local edge device 106.

In step 403, the grouping agent 137 can determine whether a networked IoT device 113 is assigned to the local edge device 106. As described in FIG. 3, the grouping agent 137, the grouping client 139, or other edge management instructions 134 can receive the grouping interface policy 132 from a management service 120. The grouping agent 137 can determine whether the networked IoT device 113 is assigned to the local edge device 106 based on the grouping interface policy 132.

In step 406, the grouping agent 137 can enable a bus redirect 151 of the networked interface device 141. The bus redirect 151 can redirect the networked interface device 141 from the networked interface device 141 to the local edge device 106. The networked IoT device 113 can communicate through the networked interface device 141, which is connected to the networked edge device 106. As a result, the bus redirect 151 can route traffic from the networked IoT device 113 to the local edge device 106. In addition, the bus redirect 151 can route traffic from the local edge device 106 to the networked IoT device 113. The bus redirect 151 can be enabled using the networked grouping client 139 on the networked edge device 106 and the grouping agent 137 on the local edge device 106. The grouping client 139 can be considered a local grouping agent 137.

In step 409, the grouping agent 137 can determine whether traffic is received from the networked grouping client 139. The traffic can include sensor data, device states, and other IoT data generated by the networked IoT device 113 and communicated to the networked interface device 141. If traffic is received from networked grouping client 139, the grouping agent 137 can route that traffic through the bus redirect 151 to the local edge device 106 for analytics. Instructions executed on the local edge device 106 can perform computations, decision-making, and other analytics using this redirected IoT data.

In step 412, the grouping agent 137 can determine whether traffic is received for the networked IoT device 113. The traffic can include commands to perform actions, collect metrics, and other instructions for the networked IoT device 113 to perform. If traffic is received for the networked IoT device 113, the grouping agent 137 can route the traffic to the IoT device 113 using the bus redirect 151. In other words, the grouping agent 137 can transmit the traffic to the networked grouping client 139 on the networked edge device 106. The networked grouping client 139 can forward the traffic to the IoT device 113.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The IoT devices 113, edge devices 106, client devices 109, and other devices including the management system 103 can include a display upon which user interfaces can be rendered. The IoT devices 113, edge devices 106, client devices 109, and other devices including the management system 103 can also include one or more input/output devices that can include, for example, a capacitive touch-screen or other type of touch input device, fingerprint reader, or keyboard.

Although the management service 120, edge management instructions 134, and other various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of, or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system, such as, a processor in a computer system or other system. The machine code can be converted from the source code. If embodied in hardware, each block can represent a circuit or a number of interconnected circuits to implement the specified logical function(s).

Although the sequence diagram and flowcharts are shown in a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included in the following claims herein, within the scope of this disclosure.

Therefore, the following is claimed:

1. A system, comprising:
   at least one computing device comprising at least one processor and a data store; and
   the data store comprising executable instructions, wherein the instructions, when executed by the at least one processor, cause the at least one computing device to at least:
   receive a grouping interface policy for an Internet-of-Things (IoT) device that communicates through an interface device of a first edge computing device, wherein the grouping interface policy indicates that the IoT device is assigned to a second edge computing device;
   enable, based on the grouping interface policy, a bus redirect of the interface device from the first edge computing device to the second edge computing device, the bus redirect being enabled using a grouping client executed on the first computing device and a grouping agent executed on the second edge computing device; and
   route, using the bus redirect, traffic from the IoT device to the second edge computing device.

2. The system of claim 1, wherein the interface device is connected to a bus of the first edge computing device.

3. The system of claim 1, wherein the interface device comprises at least one of: an RS485 controller, a controller area network (CAN) controller, a WiFi adapter, and a Bluetooth adapter.

4. The system of claim 1, wherein the instructions, when executed by the at least one processor, cause the at least one computing device to at least:
   perform, on the second edge computing device, at least one computation based on IoT data from a plurality of IoT devices connected through a plurality of interface devices of a plurality of edge computing devices.

5. The system of claim 1, wherein the instructions, when executed by the at least one processor, cause the at least one computing device to at least:
   enable a second bus redirect of the interface device from the first edge computing device to a third edge computing device, wherein the grouping client mirrors the interface device to a plurality of edge devices by concurrently maintaining the bus redirect and the second bus redirect.

6. The system of claim 1, wherein the grouping interface policy is generated based on an IoT analytics group comprising a plurality of IoT devices connected through a plurality of interface devices of a plurality of edge computing devices.

7. The system of claim 1, wherein the bus redirect routes network traffic from the IoT device to the second edge computing device over a local area network (LAN).

8. A non-transitory computer-readable medium comprising executable instructions, wherein the instructions, when executed by at least one processor, cause at least one computing device to at least:

receive a grouping interface policy for an Internet-of-Things (IoT) device that communicates through an interface device of a first edge computing device, wherein the grouping interface policy indicates that the IoT device is assigned to a second edge computing device;

enable, based on the grouping interface policy, a bus redirect of the interface device from the first edge computing device to the second edge computing device, the bus redirect being enabled using a grouping client executed on the first edge computing device and a grouping agent executed on the second edge computing device; and route, using the bus redirect, traffic from the IoT device to the second edge computing device.

9. The non-transitory computer-readable medium of claim 8, wherein the interface device is connected to a bus of the first edge computing device.

10. The non-transitory computer-readable medium of claim 8, wherein the interface device comprises at least one of: an RS485 controller, a controller area network (CAN) controller, a WiFi adapter, and a Bluetooth adapter.

11. The non-transitory computer-readable medium of claim 8, wherein the instructions, when executed by the at least one processor, cause the at least one computing device to at least:

perform, on the second edge computing device, at least one computation based on IoT data from a plurality of IoT devices connected through a plurality of interface devices of a plurality of edge computing devices.

12. The non-transitory computer-readable medium of claim 8, wherein the instructions, when executed by the at least one processor, cause the at least one computing device to at least:

enable a second bus redirect of the interface device from the first edge computing device to a third edge computing device, wherein the grouping client mirrors the interface device to a plurality of edge devices by concurrently maintaining the bus redirect and the second bus redirect.

13. The non-transitory computer-readable medium of claim 8, wherein the grouping interface policy is generated based on an IoT analytics group comprising a plurality of IoT devices connected through a plurality of interface devices of a plurality of edge computing devices.

14. The non-transitory computer-readable medium of claim 8, wherein the bus redirect routes network traffic from the IoT device to the second edge computing device over a local area network (LAN).

15. A method performed by instructions executed by at least one computing device, the method comprising:

receiving a grouping interface policy for an Internet-of-Things (IoT) device that communicates through an interface device of a first edge computing device, wherein the grouping interface policy indicates that the IoT device is assigned to a second edge computing device;

enabling, based on the grouping interface policy, a bus redirect of the interface device from the first edge computing device to the second edge computing device, the bus redirect being enabled using a grouping client executed on the first computing device and a grouping agent executed on the second computing device; and routing, using the bus redirect, traffic from the IoT device to the second edge computing device.

16. The method of claim 15, wherein the interface device is connected to a bus of the first edge computing device.

17. The method of claim 15, wherein the interface device comprises at least one of: an RS485 controller, a controller area network (CAN) controller, a WiFi adapter, and a Bluetooth adapter.

18. The method of claim 15, further comprising:

performing, on the second edge computing device, at least one computation based on IoT data from a plurality of IoT devices connected through a plurality of interface devices of a plurality of edge computing devices.

19. The method of claim 15, further comprising:

enabling a second bus redirect of the interface device from the first edge computing device to a third edge computing device, wherein the grouping client mirrors the interface device to a plurality of edge devices by concurrently maintaining the bus redirect and the second bus redirect.

20. The method of claim 15, wherein the grouping interface policy is generated based on an IoT analytics group comprising a plurality of IoT devices connected through a plurality of interface devices of a plurality of edge computing devices.

* * * * *